United States Patent
Ryba

(10) Patent No.: US 9,932,998 B2
(45) Date of Patent: Apr. 3, 2018

(54) HYDRAULIC CYLINDER, PARTICULARLY SLAVE CYLINDER FOR A HYDRAULIC CLUTCH ACTUATING SYSTEM FOR MOTOR VEHICLES

(71) Applicant: FTE automotive GmbH, Ebern (DE)

(72) Inventor: Jürgen Ryba, Reckendorf (DE)

(73) Assignee: FTE automotive GmbH, Ebern (DE)

( * ) Notice: Subject to any disclaimer, the term of this patent is extended or adjusted under 35 U.S.C. 154(b) by 0 days.

(21) Appl. No.: 15/226,010

(22) Filed: Aug. 2, 2016

(65) Prior Publication Data

US 2017/0037880 A1    Feb. 9, 2017

(30) Foreign Application Priority Data

Aug. 7, 2015   (DE) .......................... 10 2015 010 055

(51) Int. Cl.
  *F16D 25/08*    (2006.01)
  *F15B 15/26*    (2006.01)
  (Continued)

(52) U.S. Cl.
  CPC ........ *F15B 15/261* (2013.01); *F15B 15/1452* (2013.01); *F16D 25/00* (2013.01);
  (Continued)

(58) Field of Classification Search
  CPC .............. F15B 15/1447; F15B 15/1452; F15B 15/1471; F15B 15/261; F16D 25/08;
  (Continued)

(56) References Cited

U.S. PATENT DOCUMENTS 5,836,235 A * 11/1998 Rudiger ................. B60T 11/16
                                                    92/178
6,766,710 B2 * 7/2004 Reul .................... F15B 15/1447
                                                    74/473.11
(Continued)

FOREIGN PATENT DOCUMENTS

DE        44 05 581 A1        8/1995
DE       102012214124         2/2014
(Continued)

OTHER PUBLICATIONS

German Office Action—Application No. 10 2015 010 055.6, Applicant: FTE automotive GmbH, dated: Jul. 18, 2016, 4 pages.
(Continued)

*Primary Examiner* — Thomas E Lazo
*Assistant Examiner* — Michael Quandt
(74) *Attorney, Agent, or Firm* — Reising Ethington, P.C.

(57) ABSTRACT

A hydraulic cylinder has a cylinder housing in which is formed a pressure chamber variably bounded on one side by a piston of a piston subassembly that is longitudinally displaceable. A piston rod is rigidly connected with the piston, wherein the piston has an outer contour, which permits tilting of the piston subassembly in the cylinder housing, and a projection, which is at the pressure chamber side and on which a sealing element is centered and retained by a retaining ring. The sealing element has an encircling sealing lip that slidably and sealably bears against a sliding surface of the cylinder housing. The retaining ring is provided on the side thereof opposite from the sealing element with a stiffened prolongation.

18 Claims, 5 Drawing Sheets

(51) Int. Cl.
*F15B 15/14* (2006.01)
*F16D 25/00* (2006.01)

(52) U.S. Cl.
CPC ........ *F16D 25/088* (2013.01); *F15B 15/1423* (2013.01); *F15B 15/1471* (2013.01); *F15B 15/26* (2013.01); *F16D 2025/081* (2013.01); *F16D 2300/08* (2013.01)

(58) Field of Classification Search
CPC ...... F16D 25/088; F16D 25/12; F16D 25/126; F16D 2025/081; F16D 2048/0212
See application file for complete search history.

(56) References Cited

U.S. PATENT DOCUMENTS

| | | | |
|---|---|---|---|
| 6,951,104 B2 | 10/2005 | Stobrawe et al. | |
| 7,216,752 B2 * | 5/2007 | Derra | F16D 25/088 |
| | | | 192/85.59 |
| 7,287,376 B2 * | 10/2007 | Macht | F16D 25/088 |
| | | | 60/533 |

FOREIGN PATENT DOCUMENTS

| | | |
|---|---|---|
| DE | 10 2013 221 845 A1 | 5/2014 |
| GB | 2 156 481 A | 10/1985 |

OTHER PUBLICATIONS

Eumpean Search Repart; No. EP16001652 dated Jan. 26, 2017; 8 pages.

* cited by examiner

HYDRAULIC CYLINDER, PARTICULARLY SLAVE CYLINDER FOR A HYDRAULIC CLUTCH ACTUATING SYSTEM FOR MOTOR VEHICLES

TECHNICAL FIELD

The present invention relates to a hydraulic cylinder in particular, a slave cylinder for a hydraulic clutch actuating system for motor vehicles, such as used on a large scale in the automotive industry.

BACKGROUND OF THE INVENTION

A conventional hydraulic clutch actuating system for motor vehicles has a master cylinder connected with an equalizing reservoir filled with hydraulic fluid. The master cylinder has a cylinder housing with a housing bore in which a piston is received to be longitudinally displaceable. The master cylinder piston bounds a pressure chamber in the housing bore of the cylinder housing and can be mechanically loaded with an actuating force by a clutch pedal or an electric-motor drive. The pressure chamber of the master cylinder is hydraulically connected with a pressure chamber of a slave cylinder by way of a pressure line so that the pressure generated in the pressure chamber of the master cylinder by depressing the clutch pedal or electric-motor displacement of the master cylinder piston is transmissible to the pressure chamber of the slave cylinder by way of a fluid column in the pressure line. The slave cylinder similarly includes a cylinder housing with a housing bore in which a piston bounding the pressure chamber of the slave cylinder and thus loadable with the pressure generated in the master cylinder is received to be longitudinally displaceable. Associated with the slave cylinder piston is a piston rod engaging a clutch lever which in turn is in operative connection with the release bearing of the clutch. As a result, the release bearing of the clutch can be loaded with an actuating force via the slave cylinder piston so as to separate the clutch pressure plate from the clutch drive disc by way of a release mechanism and thus the motor from the transmission of the motor vehicle.

An actuating cylinder, particularly a slave cylinder for a hydraulic clutch actuating system for motor vehicles, which comprises a cylinder housing in which a pressure chamber is formed, is known from document U.S. Pat. No. 5,836,235 The pressure chamber is variably bounded on one side by a piston of a piston subassembly, which is received longitudinally displaceably in the cylinder housing. A piston rod is rigidly connected with the piston such that the cost associated with the pivotable coupling of the piston rod to the piston as widely used in the prior art is avoided. The piston has an outer contour permitting slight tilting of the piston subassembly in the cylinder housing. In addition, the piston has an encircling groove, which extends in axial direction and is open towards the pressure chamber, for reception of an annular seal, i.e. groove ring centered and retained on an extension of the piston at the pressure chamber side by a retaining ring, i.e., spring plate, which is engaged by a helical compression spring received in the pressure chamber. The seal has an encircling sealing lip that slidably and sealably bears against a sliding surface of the cylinder housing at the inner circumference.

The encircling groove extends in axial direction and is open towards the pressure chamber of the piston. A flank of the piston thereof facing the cylinder wall ensures that the seal is not excessively deformed even when pivoting of the piston rod or the piston relative to the cylinder housing takes place, so that sufficient fluid tightness of the actuating cylinder shall be provided.

This construction may be applicable to the installed state of the actuating cylinder where the piston rod is guided by its end remote, i.e., opposite from the piston or is mounted at a coupling lever and also the piston is mostly disposed in a stroke setting in which the piston rod in the case of tilting of the piston could if necessary come into contact with the cylinder housing. However, it can be problematic if the actuating cylinder is demounted, for example, in the course of repairs to the motor vehicle, so that the piston rod is no longer guided or held. If the piston as a consequence of its spring loading then travels into a stroke setting near the open end of the cylinder housing, where even the cylinder housing cannot sufficiently limit pivotation of the piston rod, then pivot angles of, for example, equal to or greater than 7° between the piston rod and the center axis of the cylinder housing can easily arise. However, in the case of such comparatively large pivot angles it is possible for resilient deformation of the seal to occur to such an extent that leakages arise and wet the actuating cylinder. It can then easily happen that the actuating cylinder is incorrectly regarded as defective and exchanged, although in remounted state it would readily fulfill its function.

What is desired is to create a hydraulic cylinder for a hydraulic actuating system for motor vehicles, which always particularly even in the unmounted state has sufficient fluid tightness.

SUMMARY OF THE INVENTION

According to one aspect of the invention, in a hydraulic cylinder, particularly a slave cylinder for a hydraulic clutch actuating system for motor vehicles has a cylinder housing in which is formed a pressure chamber variably bounded on one side by a piston of a piston subassembly, which is longitudinally displaceably received in the cylinder housing. A piston rod is rigidly connected with the piston, wherein the piston has an outer contour permitting tilting of the piston subassembly in the cylinder housing and an extension which is at the pressure chamber side and on which a sealing element is retained and centered by a retaining ring. The sealing element has an encircling sealing lip slidably and sealably bearing against a sliding surface at the inner circumference of the cylinder housing. The retaining ring is provided on the side thereof opposite from the sealing element with a stiffened prolongation adapted with respect to the length and/or diameter thereof to come into contact with the sliding surface of the cylinder housing so as to support the piston subassembly at the cylinder housing upon tilting of the piston subassembly in the cylinder housing by a predetermined tilt angle of the piston subassembly relative to the center axis of the cylinder housing.

As a result, a greater degree of tilting of the piston subassembly relative to the center axis of the cylinder housing and accompanying excessive deformation of the sealing element with consequential leakage of the hydraulic cylinder, for example, at the time of demounting, the hydraulic cylinder in a workshop are expeditiously and reliably prevented which leakage could otherwise lead to the hydraulic cylinder being incorrectly regarded as defective resulting in time-consuming and expensive replacement.

Through suitable selection of the length and/or the diameter of the stiffened prolongation of the retaining ring, it is in that case possible without problems to predetermine or fix a maximum permissible tilt angle of the piston subassembly relative to the center axis of the cylinder housing. This limitation of the tilt angle preferably is carried out to an angle value which is not reached in normal operation of the mounted hydraulic cylinder, in which the piston rod of the piston subassembly, for example in the case of a clutch slave cylinder, is pivoted or deflected out of the center position with respect to the cylinder housing in accordance with the pivot movement of the clutch lever and in dependence on the stroke setting of the piston in the cylinder housing. Thus, the angle value can be fixed at, for example, 5°, i.e. after tilting the piston rod through 5° relative to the center axis of the cylinder housing of the demounted hydraulic cylinder the stiffened prolongation of the retaining ring comes into contact with the sliding surface of the cylinder housing to prevent further tilting of the piston subassembly and thus, possibly accompanying critical deformation of the sealing element, regardless of, in particular, the respective stroke setting of the piston in the cylinder housing.

By selection of the dimensions of the stiffened prolongation of the retaining ring, the piston subassembly is supported by way of the retaining ring on the sliding surface of the cylinder housing at a lever arm from a virtual tilt point or fulcrum of the piston.

A further advantage of the construction of the hydraulic cylinder in accordance with the invention is that use is made of a component which is present in any case, namely the retaining ring, at or in which the abutment function or tilt limiting function is integrated as a further function, this being conducive to an expeditious and economic design with few parts. Ultimately, such a multi-functional retaining ring can also be produced very economically in mass production by injection-molding from plastic material.

In a preferred embodiment of the invention, the prolongation of the retaining ring has a substantially hollow-cylindrical outer section which is supported in radial direction on the extension of the piston by way of a plurality of stiffening elements uniformly distributed over the inner circumference of the outer section. By comparison with equally conceivable other geometries, for example, an outer section of the retaining ring conically widening in direction away from the sealing element, the hollow-cylindrical configuration is particularly distinguished by its ease of manufacture, namely by injection-molding from plastic material. In addition, by virtue of the symmetrical arrangement or distribution of the stiffening elements, a directionally specific mounting or a mounting oriented in terms of rotational angle of the retaining ring at the extension of the piston or of the entire piston subassembly in the cylinder housing becomes unnecessary.

Attainment of a very high level of stiffness is achieved if the stiffening elements extending along the outer section have the form of a hollow-chambered section member and each member has a substantially trapezium-shaped cross-section, the narrow side thereof bearing against the extension of the piston.

In principle, the retaining ring can be mounted on the extension of the piston by a weld or adhesive connection. On the other hand, however, for an easy and economic mounting it is preferred if the retaining ring is secured to the extension of the piston by a snap connection, which can, in particular, be constructed from a plastic material. The retaining ring preferably has a plurality of spring arms which extend in an axial direction and are each provided at the free end thereof radially inwardly with a respective lug-like projection in engagement with a radial groove formed at the outer circumference of the extension. However, other mechanically positive connections, optionally in combination with a frictional coupling, such as a screw connection, are also conceivable for attaching the retaining ring to the piston extension.

With respect to a short constructional length and efficient utilization of existing installation space, it is in that regard particularly preferred if the spring arms of the retaining ring as seen in circumferential direction are respectively arranged between adjacent stiffening elements of the retaining ring so that the attachment and support of the retaining ring to and on the extension of the piston is at the same location as seen in axial direction of the piston subassembly.

In an additional embodiment of the invention, the retaining ring can be provided at the side thereof facing the piston with an annular pressing projection engaged in an annular axial groove of the sealing element. The groove on the side of the sealing element opposite from the piston separates the sealing lip from an annular fastening section of the sealing element. The annular fastening section is seated on the extension of the piston. Such a pressing projection ensures expeditious maintenance of the sealing element geometry even under radial load on the sealing element and at the same time reliably keeps the sealing element in its seat at the piston.

The retaining ring preferably also has on the side thereof facing the piston a circularly annular planar end surface by way of which the retaining ring can be supported in the axial direction of the piston on an associated annular shoulder formed at the outer circumference of the extension. Through this simple measure there is created a mounting abutment which in the case of possible automated mounting of the piston subassembly reliably prevents damage of the sealing element and of the snap connection including spring arms, lug-like projections, and a radial groove.

In order to keep the end, which is at the piston rod side, of the hydraulic cylinder in the mounted state thereof in contact with, for example, an associated seat at a coupling lever there can additionally be arranged on the side of the piston opposite from the pressure chamber a spring element which is supported at one end on a spring plate attached to the cylinder housing and operatively connected at the other end with the piston rod so that it biases the piston subassembly in a direction away from a base of the cylinder housing. By comparison with a solution in which the spring element constructed as a helical compression spring is arranged in the pressure chamber, where it is supported at one end on the base of the cylinder housing and at the other end on the piston by way of a spring plate, such as shown in, for example, U.S. Pat. No. 5,836,235, the afore-described preferred embodiment of the hydraulic cylinder is advantageous to the extent that there is no risk of the spring element contacting and possibly damaging the cylinder housing wall in the region of the seal sliding surface. Moreover, self-bleeding is better here, not only in the case of first filling, but also in operation of the hydraulic cylinder, because no spring element to which air bubbles could adhere is present in the pressure chamber. Finally, in the case of this embodiment the spring element can also serve for setting the piston rod straight, for example during mounting.

Moreover, in order in the case of such equipping of the hydraulic cylinder with a spring element to temporarily shackle the piston rod with respect to the cylinder housing, for example, for avoidance of overfilling of a hydraulic clutch actuating system, for transport thereof as well as simplification of mounting of the unit in the motor vehicle, a fixing section can be provided which fixes the piston subassembly in a predetermined stroke setting with respect to the cylinder housing prior to first actuation of the hydraulic cylinder and is constructed for the purpose of releasing the piston subassembly relative to the cylinder housing when first actuation of the hydraulic cylinder takes place, wherein the fixing section is advantageously provided at the spring plate and co-operates with a mating section of the piston rod for releasable fixing of the piston subassembly with respect to the cylinder housing.

Thus, here no additional component, which demands further installation space, is provided in order to form the fixing section. Instead, a component which is present in any case, namely the spring plate, is advantageously used to provide an integrated releasable fixing of the piston subassembly relative to the cylinder housing. Thus, an expeditious and economic construction with few parts is achieved, wherein use is even made of the constructional space provided for the spring element. A further advantage of the arrangement of such a fixing section at the spring plate in accordance with one embodiment of the invention is that, by comparison with other previously known solutions with temporary fixing of the piston subassembly relative to the cylinder housing on the piston rod side of the piston opposite from the pressure chamber, the fixing section cannot migrate or move in the axial direction of the hydraulic cylinder at the time of or after first actuation of the hydraulic cylinder, but remains at the spring plate in a fixed position as seen in the axial direction of the hydraulic cylinder. Thus, in principle it is possible, for example for repair purposes or even after an unintended release of the temporary shackling during transport of the hydraulic cylinder, to re-shackle or shackle once more the mating section at the piston rod to the fixing section of the stationary spring plate and consequently the piston subassembly relative to the cylinder housing.

In principle it is possible, for retaining or centering the spring element relative to the cylinder housing, to provide the spring plate with, for example, an annular projection which engages within a piston-adjacent end of the spring element. However, with respect to secure seating of the spring element in conjunction with a short form of construction it is preferred if the spring plate is formed by an annular member with an inner annular section through which the piston rod extends, an outer annular section by way of which the spring plate is secured to the cylinder housing, a base section which connects the inner annular section and the outer annular section, and an annular recess, which is bounded between the aforesaid sections, for receiving the piston-adjacent end of the spring element.

Preferably, the inner annular section has at its free end at the inner circumference an annular bead which forms the fixing section of the spring plate and which is capable of slight radial spring-back, whereas the piston rod has a piston rod head provided at the outer circumference with a substantially crowned annular collar as seen in cross-section, which forms the mating section of the piston rod and which in the fixed state of the piston subassembly is axially supported on the annular bead. As an alternative, in principle a construction is also contemplated in which an elevated structure, for example, an encircling lug or several lugs distributed over the circumference at one part (spring plate or piston rod head) is in engagement with an annular groove at the respective other part so as to provide temporary shackling of the piston subassembly relative to the cylinder housing. On the other hand, however, the afore-described bead-like or crowned form, which is elevated on both sides, of the fixing section at the spring plate and the mating section of the piston rod is preferred. The preferred configuration makes possible problem-free over-riding in two opposite directions (releasing or shackling) and thus, being of advantage particularly with respect to reinstating the temporary fixing of the piston subassembly with respect to the cylinder housing.

In order to ensure a defined angular movability of the piston rod relative to the cylinder housing in simple manner, the inner annular section of the spring plate, which is attached to the cylinder housing with rotational angle orientation about the center axis, can in addition be provided with cut-outs at sides which are diametrically opposite with respect to a center axis of the cylinder housing, the cut-outs allowing a defined deflection of the piston rod relative to the center axis of the cylinder housing in the released state of the piston subassembly. Depending on the effective diameter of the hydraulic cylinder, the cut-outs at the inner annular section can in that case interrupt the annular shape thereof as seen in circumferential direction (in the case of smaller effective diameters) or, however, form only radial depressions at the inner annular section (in the case of larger effective diameters).

Moreover, the spring plate can have an annular centering projection on the side of the base section opposite from the annular recess so as to advantageously integrate further functions into the spring plate. Thus, the centering projection of the spring plate can have a conically chamfered inner circumferential surface with which a mating surface of complementary form at the outer circumference of the piston can be brought into contact when the piston subassembly is released, so as to substantially align the piston rod which is rigidly connected with the piston with the center axis of the cylinder housing. This construction on the one hand expedites, at the time of first assembly of the piston subassembly, attachment of the spring plate to the cylinder housing, in which case the spring element preassembled at the piston subassembly stresses the spring plate relative to the piston and in that case as a consequence of the contact of the conically chamfered inner circumferential surface of the centering projection with the mating surface of complementary shape at the outer circumference of the piston sets or holds the spring plate perpendicularly with respect to the piston rod. On the other hand, in the assembled state of the hydraulic cylinder it is, thus, possible to stress the piston by the spring element against the spring plate fastened to the cylinder housing so as to set or hold the piston rod straight with respect to the cylinder housing by virtue of the contact of the conically chamfered mating surface at the outer circumference of the piston with the inner circumferential surface of complementary shape of the centering projection of the spring plate, which, for example, expedites mounting thereof in the event of exchange of the hydraulic cylinder.

Although the piston can in principle be injection-molded integrally with the piston rod from plastic material, in the present case it is preferred for reasons of strength in conjunction with compact dimensions if the piston is injection-molded from plastic material on the piston rod so as to rigidly connect the piston with the piston rod.

BRIEF DESCRIPTION OF THE DRAWINGS

The invention is explained in more detail in the following by way of a preferred embodiment with reference to the accompanying, partly schematic drawings, in which for simplification of the illustration elastomeric parts are shown in undeformed state and in which.

DETAILED DESCRIPTION OF THE EMBODIMENT

Figure 1:
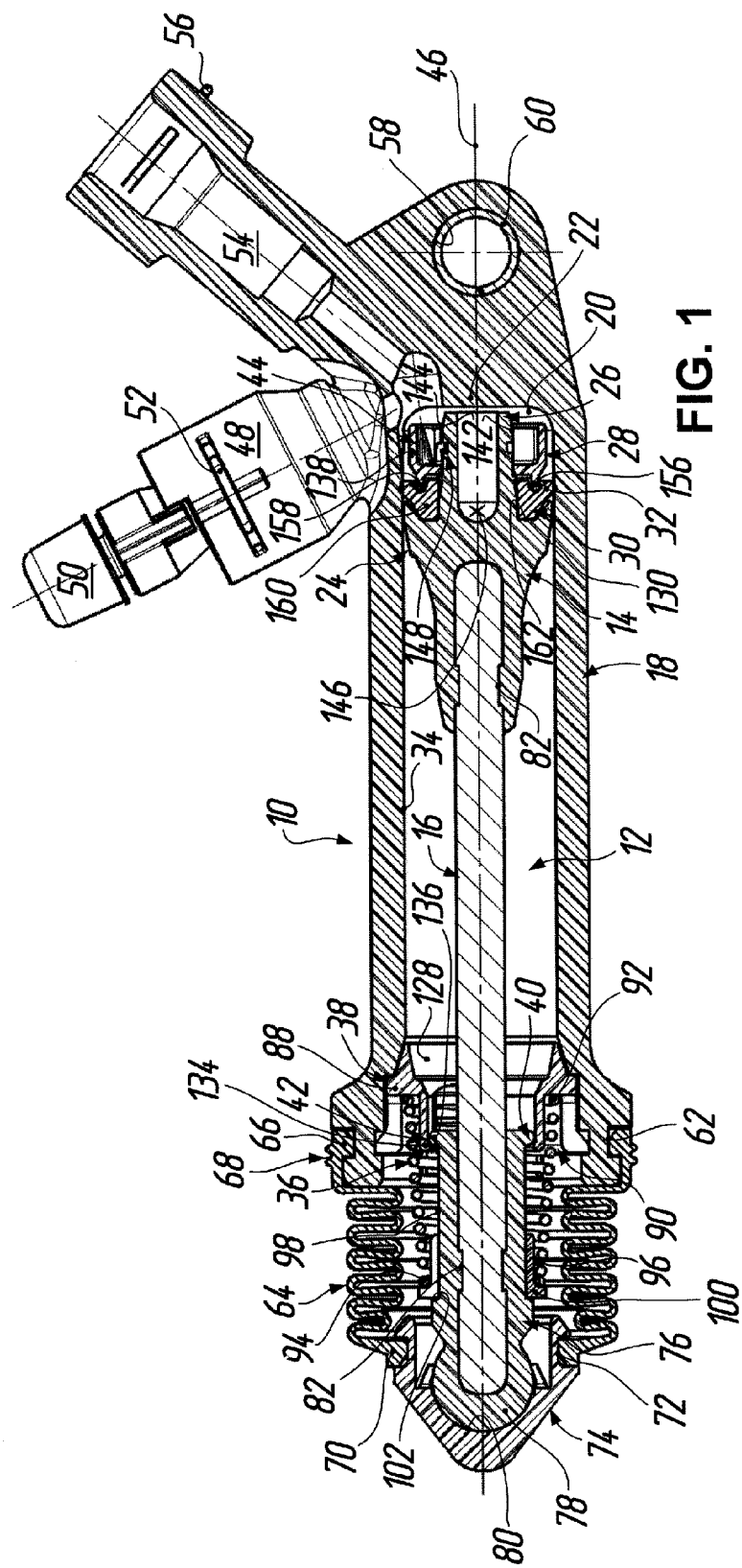
FIG. 1 shows a side view, which is broken away along a center axis up to a bleed connection, of a slave cylinder constructed in accordance with one embodiment of the invention for a hydraulic clutch actuating system for motor vehicles in the uninstalled state, illustrating a piston subassembly which is longitudinally displaceably received in a cylinder housing in a predetermined stroke setting with respect to the cylinder housing in which the piston subassembly is releasably held against the force of a spring element supported by way of a spring plate on the cylinder housing, by a fixing section provided at the spring plate and for this purpose co-operates with a mating section at a piston rod of the piston subassembly.

According to FIG. 1, a slave cylinder 10 for a hydraulic clutch actuating system for motor vehicles has a piston subassembly 12 with a piston 14 and piston rod 16 rigidly connected therewith, as well as a cylinder housing 18 in which is formed a pressure chamber 20 variably bounded on one side (at the left in FIG. 1) by the piston 14 received in the cylinder housing 18 to be longitudinally displaceable and fixedly bounded on the other side (at the right in FIG. 1) by a base 22 of the cylinder housing 18. The piston 14 is injection-molded from plastic material on the piston rod 16 and has an outer contour 24 which allows tilting of the piston subassembly 12 in the cylinder housing 18. In addition, the piston 14 has on the pressure chamber side an extension 26 on which a sealing element 30 is held and centered by a retaining ring 28. The sealing element 30 has an encircling sealing lip 32 slidably and sealably bearing against a sliding surface 34 of the cylinder housing 18 at the inner circumference.

Figure 2:
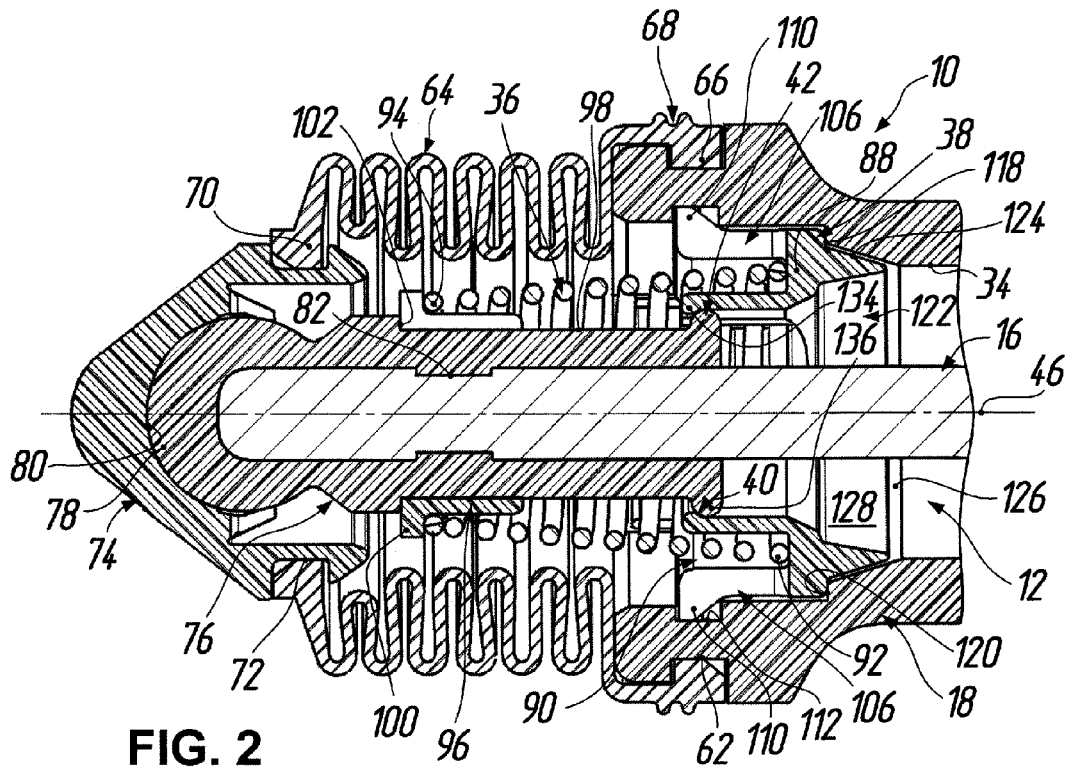
FIG. 2 shows an illustration, which is enlarged in scale by comparison with FIG. 1 and which is broken away to the right, but otherwise corresponds with FIG. 1, of the end of the slave cylinder according to FIG. 1 at the left in FIG. 1, for depiction of further details with respect to the measures for temporary shackling of the piston subassembly relative to the cylinder housing.

A spring element 36 is arranged at the side of the piston 14 opposite from the pressure chamber 20. The spring element is supported at one end on a spring plate 38 on the side of the housing and is operatively connected at the other end with the piston rod 16 so as to bias the piston subassembly 12 in a direction away from the base 22 of the cylinder housing 18. The spring plate 38 is a separate part from the cylinder housing 18. In addition, a fixing section 40 is provided, which fixes the piston subassembly 12 in a predetermined stroke setting with respect to the cylinder housing 18 before first actuation of the slave cylinder 10, as shown in FIGS. 1 and 2, and which is constructed to release the piston subassembly 12 relative to the cylinder housing 18 when first actuation of the slave cylinder 10 takes place, so that the piston rod 16 of the slave cylinder 10 can be temporarily shackled with respect to the cylinder housing 18 of the slave cylinder 10 for avoidance of overfilling of the hydraulic clutch actuating system, for transport of the slave cylinder 10 and for simplification of mounting of the unit in the motor vehicle.

As will be described in more detail in the following with reference to, in particular, FIGS. 2, 4 to 7 and 10, the fixing section 40 is formed at the spring plate 38 and co-operates with a mating section 42 at the piston rod 16 for releasable fixing of the piston subassembly 12 with respect to the cylinder housing 18.

In addition, as will similarly be explained in more detail in the following on the basis of, in particular, FIGS. 11 to 15, the retaining ring 28 is provided with a stiffened prolongation 44 on the side thereof opposite from the sealing element 30. The stiffened prolongation 44 is adapted with respect to the length and/or diameter thereof to come into contact with the sliding surface 34 of the cylinder housing 18 when tilting of the piston subassembly 12 in the cylinder housing takes place so as to support the piston subassembly 12 at the cylinder housing 18 when a predetermined tilt angle of the piston subassembly 12 relative to the center axis 46 of the cylinder housing 18, for example, 5° is reached, so that leakages between the sealing lip 32 of the sealing element 30 and the sliding surface 34 in the cylinder housing 18 are reliably avoided.

According to FIG. 1, the cylinder housing 18 of the slave cylinder 10 is injection-molded from plastic material and is provided in the region of the base 22 with two integrally formed connections which open into the pressure chamber 20 at the end thereof on the right in FIG. 1. These connections are on the one hand a bleed connection 48 in which a bleeder 50 known per se is sealably received and secured by a securing element 52, and on the other hand, a pressure connection 54 into which a pressure line (not shown) is insertable by a plug member to be hydraulically sealed and is fixable by a further securing element 56, so as to hydraulically connect the slave cylinder 10 with a clutch master cylinder (not illustrated) in a manner known per se. In order to secure the slave cylinder 10 to, for example, a transmission wall (not shown) the cylinder 18 additionally has near the base 22 a fastening bore 58 which is lined or reinforced by a slotted steel bush 60 through which in the mounted state of the slave cylinder 10, for example, a screw (not illustrated) extends as a fastening measure.

The open end of the cylinder housing 18 on the left in FIG. 1 is provided at the outer circumference with a radial groove 62 in which an elastomeric bellows 64 is located by an annular collar 66 at the inner circumference to protectively surround the spring element 36. Fastening measures (not shown) radially retain the annular collar 66 at 68 (engagement point for the fastening measures) in this position. The bellows 64 is provided at the end thereof opposite from the cylinder housing 18 and at the inner circumference with a further annular collar 70 which is located in a radial groove 72 formed in a protective dust cap 74. The protective dust cap 74, by way of which the piston rod 16 in the mounted state of the slave cylinder 10 in the motor vehicle engages a clutch lever (not shown) to be effective in terms of actuation, is articulated to the piston rod 16 in a manner known per se to be pivotable relative to the piston rod 16. More specifically, the piston rod 16 has a piston rod head 76 with a ball end 78 which mechanically positively engages in an inner ball guide section 80 of the protective dust cap 74.

In the illustrated embodiment, the piston rod head 76, like the piston 14, is also injection-molded from plastic material on the metallic piston rod 16. Profilings which here are in the form of grooves 82 into which the plastic material can penetrate and which are formed at the ends of the rod-shaped piston rod 16 in that case ensure tension-resistant and compression-resistant fixing of the piston rod head 76 or the piston 14 to the piston rod 16.

The cylinder housing 18 has its inner circumference multiply stepped at the open end thereof in front of the sliding surface 34 to have a diameter decreasing towards the sliding surface 34 and chamfered so as to receive the spring plate 38. These steps and chamfers at the inner circumference of the cylinder housing 18 co-operate with complementary geometries at the spring plate 38 as will be described in more detail in the following.

Further details of the spring plate 38, which is formed by an annular member separate from the cylinder housing 18, can be inferred from, in particular, FIGS. 4 to 7 and 10. According to those, the spring plate 38 has in general an inner annular section 84 through which the piston rod 16 extends (see FIGS. 1 and 2), an outer annular section 86 by way of which the spring plate 38 is secured, in a manner still to be described, to the cylinder housing 18, and a base section 88 connecting the inner annular section 84 and the outer annular section 86. In that case, the aforesaid sections 84, 86 and 88 of the spring plate 38 bound an annular recess 90 which, as FIGS. 1 and 2 show, serves for reception of a larger diameter end 92, which is near the piston, of the spring element 36. As illustrated, the spring element is constructed as a substantially conically formed helical compression spring.

Accordingly, the spring element 36 is supported by its piston-adjacent end 92 which is on the right in FIGS. 1 and 2, on the base section 88 of the spring plate 38. The smaller diameter end 94 of the spring element 36, which is on the left in FIGS. 1 and 2 and distant from the piston, engages the piston rod head 76 by way of a slotted counter retaining ring 96. The retaining ring 96 is snap-fitted on an associated support surface 98 at the piston rod head 76 and has at the end a radially outwardly protruding annular collar 100 that bears against the piston-distant end 94 of the spring element 36. The annular collar 100 is axially supported on its side opposite from the piston 14 on an annular shoulder 102 formed on the piston rod head 76. The spring element 36 is supported by way of the spring plate 38 on the cylinder housing 18 to exert on the piston subassembly 12 via the piston rod head 76 a force which acts towards the left in FIGS. 1 and 2 and endeavors to urge the protective dust cap 74 to the left and by way of the piston rod 16 to draw the piston 14 away from the base 22 of the cylinder housing 18.

Figure 4:
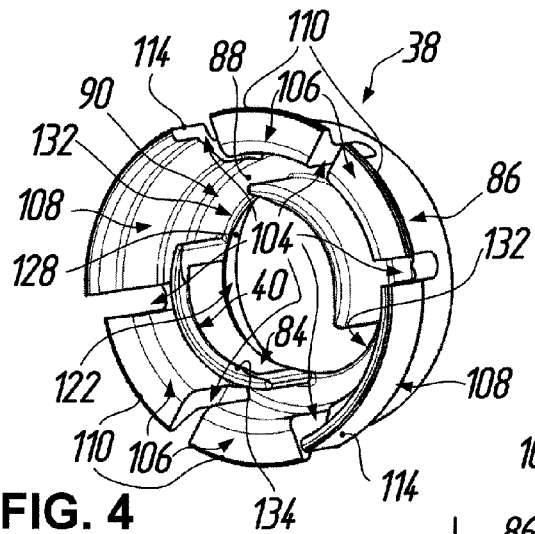
FIG. 4 shows a perspective illustration, which is enlarged in scale by comparison with FIG. 1, of the spring plate, which is separated from the cylinder housing, of the slave cylinder according to FIG. 1 obliquely from the front.
Figure 5:
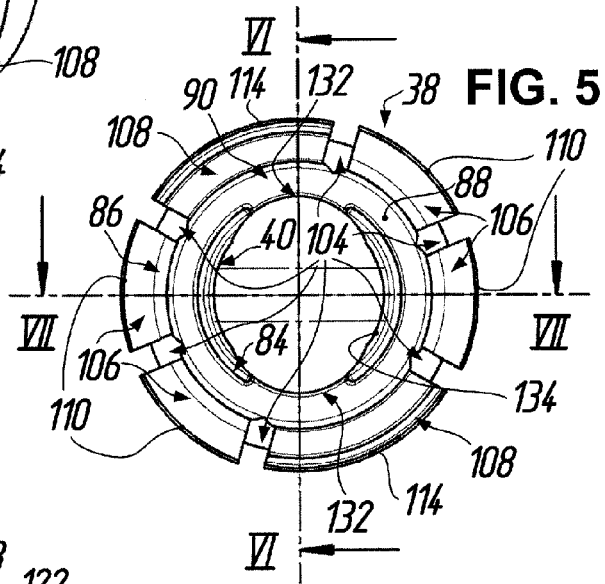
FIG. 5 shows a front view of the spring plate according to FIG. 4 in the scale of FIG. 4.

According to, in particular, FIGS. 4 and 5 the outer annular section 86 of the spring plate 38 is provided, starting from its free end, with a plurality of axial slots 104 distributed over the circumference and extending in the direction of the base section 88. The slots 104 divide the outer annular section 86 into different segments 106, 108 serving to fix the spring plate 38 to the cylinder housing 18. In that case, the segments 106 in the illustrated embodiment form four spring arms which according to, in particular, FIG. 7 are provided at each of the free ends thereof and radially outwardly with a respective lug-like protrusion 110 in engagement with a radial groove 112, which is formed at the inner circumference of the cylinder housing 18, so as to secure the spring plate 38 in axial direction to the cylinder housing 18 in the manner of a snap connection. In addition, the two other diametrically opposite segments 108 of the outer annular section 86 of the spring plate 38 in the illustrated embodiment have, according to, in particular, FIGS. 4, 6, 7 and 10, at each of the free ends thereof a respective radially outwardly and axially protruding part-cylindrical end section 114 which mechanically positively engages with a respective complementary recess 116 at the inner circumference of the cylinder housing 18 (see, in particular, FIGS. 8 and 10) so as to secure the spring plate 38 against rotation in the cylinder housing 18.

Figure 3:
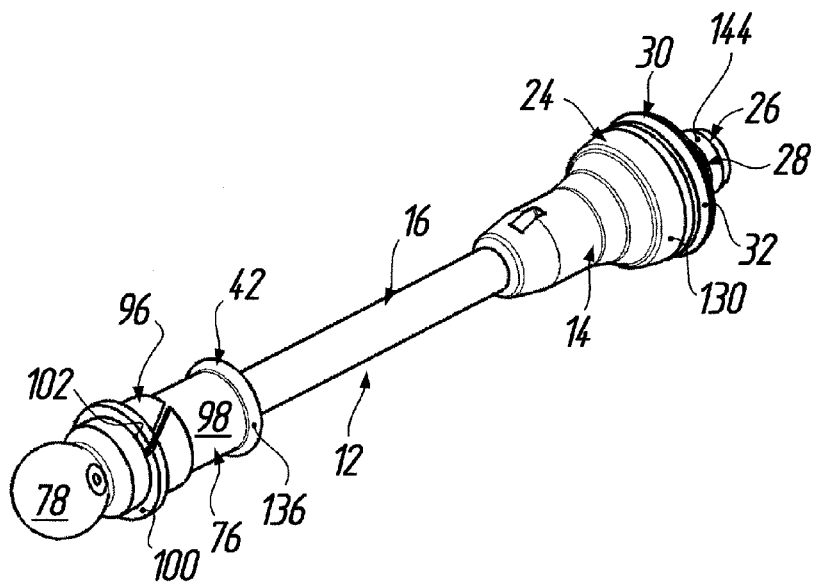
FIG. 3 shows a perspective illustration of the piston subassembly, which is separated from the cylinder housing, of the slave cylinder according to FIG. 1 with a slotted retaining ring, which is mounted on the piston rod head, for the spring element.
Figure 6:
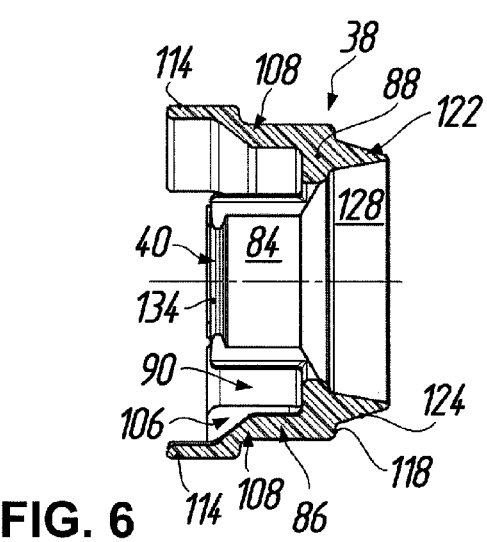
FIG. 6 shows a longitudinal sectional view of the spring plate according to FIG. 4 in correspondence with the section line VI-VI in FIG. 5.
Figure 7:
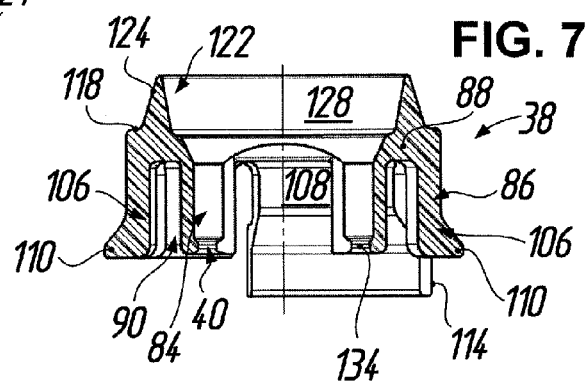
FIG. 7 shows a longitudinal sectional view of the spring plate according to FIG. 4 in correspondence with the section line VII-VII in FIG. 5.
Figure 8:
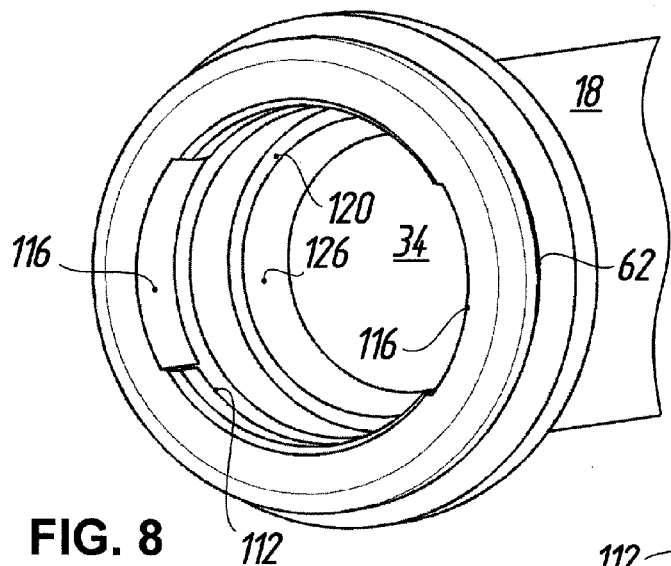
FIG. 8 shows a perspective illustration, which is broken away to the right, of an open end of the cylinder housing of the slave cylinder according to FIG. 1 obliquely from the front and in the scale of FIG. 4, without the spring plate mounted on the cylinder housing.
Figure 9:
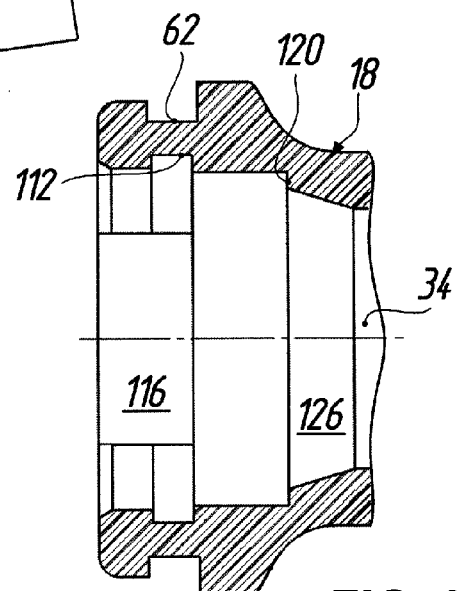
FIG. 9 shows a longitudinal sectional view, which is broken away to the right, of the cylinder housing of FIG. 8 in the region of the open end, without the plate spring mounted on the cylinder housing.

As can be further inferred from, in particular, FIGS. 2, 6 and 7, the base section 88 of the spring plate 38 has at its side opposite from the annular recess 90 a circularly annular planar end surface 118 by which the spring plate 38 is supported in axial direction of the cylinder housing 18 on an associated annular shoulder 120 formed at the inner circumference of the cylinder housing 18. An annular centering projection 122 is formed, as again can be best seen in FIGS. 2, 6 and 7, radially within the circularly annular end surface 118 on the spring plate 38 at the side of the base section opposite from the annular recess 90. The centering projection 122 has a conically chamfered outer circumferential surface 124 which, according to FIG. 2, opposes a mating surface 126 of complementary shape at the inner circumference of the cylinder housing 18. In addition, the centering projection 122 has a conically chamfered inner circumferential surface 128 against which a mating surface 130 of complementary shape at the outer circumference of the piston 14 (see FIGS. 1 and 3) can be brought into contact, when the piston subassembly 12 is released from the fixing section 40, so as to substantially align the piston rod 16 with the center axis 46 of the cylinder housing 18.

Figure 10:
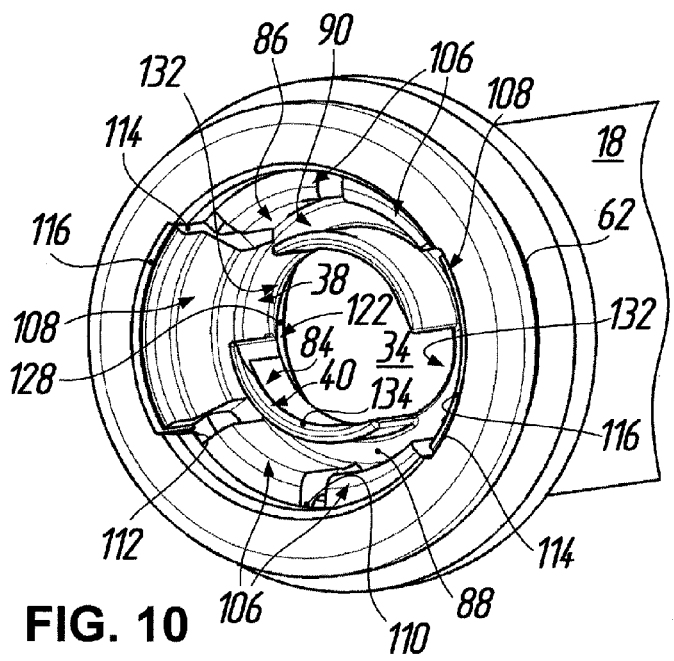
FIG. 10 shows a perspective illustration, which is broken away to the right and corresponds in viewing angle and scale with FIG. 8, of the open end of the cylinder housing of the slave cylinder according to FIG. 1, with the spring plate according to FIG. 4 mounted on the cylinder housing.

As, in particular, FIGS. 4, 5 and 10 in addition show the inner annular section 84 of the spring plate 38 is provided with a total of two cut-outs 132 on sides which are diametrically opposite with respect to the center axis 46 of the cylinder housing 18, the cut-outs interrupting the inner annular section 84 in the illustrated embodiment and extending in axial direction up to the base section 88 of the spring plate 38. The cut-outs 132 allow a defined deflection of the piston rod 16 relative to the center axis 46 of the cylinder housing 18 in the state of release of the piston subassembly 12 from the fixing section 40, specifically when the piston rod 16 is pivoted from a substantially central position with respect to the cylinder housing 18 in the direction of a cut-out 132. The inner annular section 84 of the spring plate 38 otherwise limits, depending on the stroke setting of the piston 14 in the cylinder housing 18, the deflection of the piston rod 16, in which case, however, the retaining ring 28 at the piston 14 ensures that a predetermined tilt angle of the piston subassembly 12 relative to the center axis 46 of the cylinder housing 18 is never exceeded, as already explained further above.

Finally, the inner annular section 84 of the spring plate 38 has at the free end thereof at the inner circumference an annular bead 134 which forms the fixing section 40 of the spring plate 38 and can spring back slightly in radial direction and which in the embodiment illustrated here is interrupted by the cut-outs 132. In addition, the piston rod head 76 is provided at the end thereof facing the piston 14 at the outer circumference with an annular collar 136 which forms the afore-mentioned mating section 42 at the piston rod 16 and is substantially crowned as seen in cross-section (cf. FIG. 2) and which in the fixed state of the spring-biased piston subassembly 12 is axially supported on the annular bead 134 of the spring plate 38 so as to temporarily shackle the piston subassembly 12 in the cylinder housing 18 in the setting shown in FIGS. 1 and 2.

Figure 11:
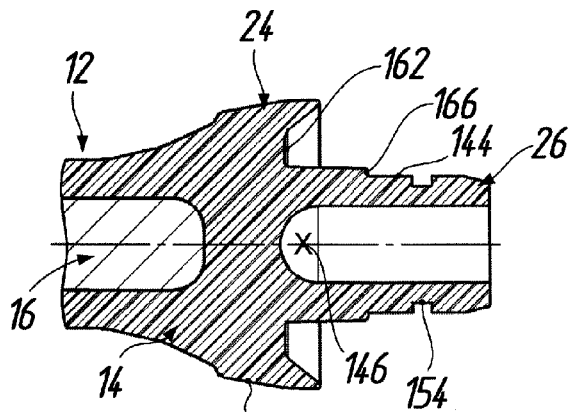
FIG. 11 shows a longitudinal sectional view, which is broken away to the left, of a piston, which is mounted on the piston rod, of the piston subassembly of the slave cylinder according to FIG. 1 in the scale of FIG. 2, without sealing element and retaining ring therefor.
Figure 12:
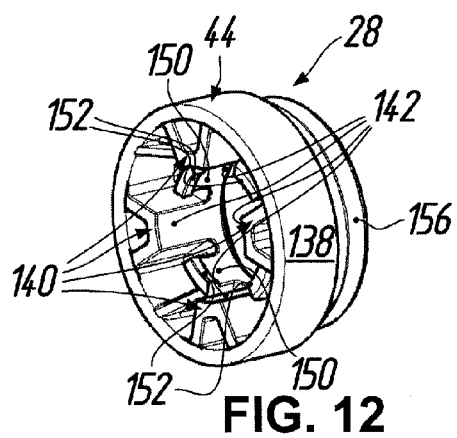
FIG. 12 shows a perspective illustration, which is enlarged in scale by comparison with FIG. 1, of the retaining ring, which is separated from the piston of the slave cylinder according to FIG. 1, for the sealing element obliquely from the front.
Figure 13:
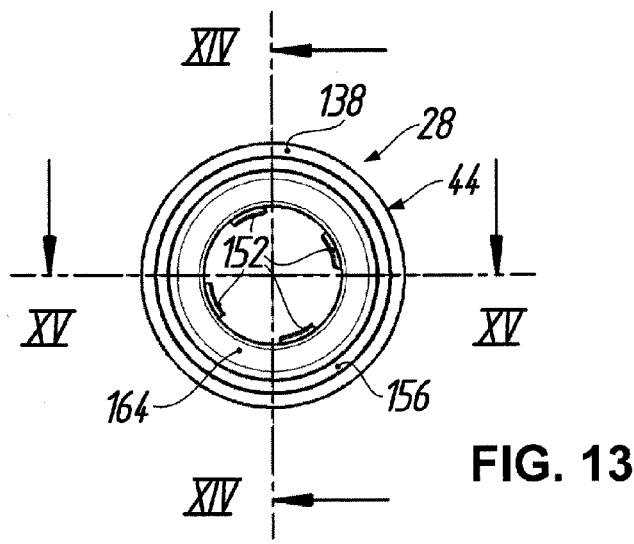
FIG. 13 shows a rear view of the retaining ring according to FIG. 12 in the scale of FIG. 12.
Figure 14:
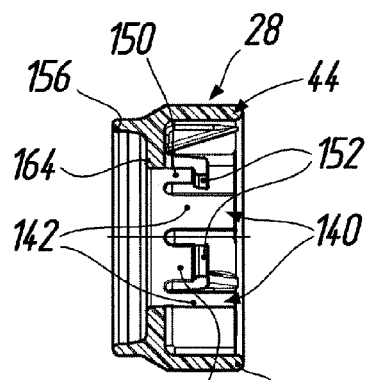
FIG. 14 shows a longitudinal sectional view of the retaining ring according to FIG. 12 in correspondence with the section line XIV-XIV in FIG. 13.
Figure 15:
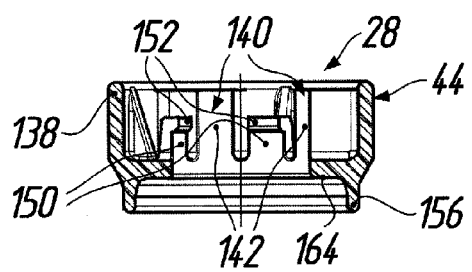
FIG. 15 shows a longitudinal sectional view of the retaining ring according to FIG. 12 in correspondence with the section line XV-XV in FIG. 13.

Further details with respect to the retaining ring 28 and attachment thereof to the extension 26 of the piston 14 are illustrated in FIGS. 11 to 15. According to FIGS. 12, 14 and 15 the prolongation 44 of the retaining ring 28 has a substantially hollow-cylindrical outer section 138 which is supported in radial direction on the extension 26 of the piston 14 by way of a plurality in the illustrated embodiment, four stiffening elements 140 uniformly distributed over the inner circumference of the outer section 138. As can be seen in FIG. 12, the stiffening elements 140 extend in axial direction along the outer section 138 and have a construction like a hollow-chambered section member with a substantially trapezium-shaped cross-section. In the mounted state of the retaining ring 28 (see FIG. 1), the stiffening elements 140 each bear by the radially inner narrow side 142 thereof against the extension 26 of the piston 14, more precisely the outer circumferential surface 144 thereof.

For example, in the course of demounting, the slave cylinder 10 from its installation location a greater degree of deflection of the piston rod 16, and thus, of the entire piston subassembly 12 relative to the center axis 46 of the cylinder housing 18 can take place. The piston 14 may then tilt i.e., pivot about a virtual fulcrum 146 approximately at the axial location of the sealing element 30. The piston 14 is, however, supported on the sliding surface 34 of the cylinder housing 18 by way of the outer circumferential surface 144 of its extension 26, the corresponding narrow side or sides 142 of the stiffening element or elements 140 of the retaining ring 28 and the outer section 138 thereof, specifically the radially outer end of the outer section 138 opposite from the piston 14. In particular, support takes place at an axial spacing from the virtual fulcrum 146 of the piston 14 and thus with a specific lever arm. As a result, deformation of the sealing lip 32, which is pressed against the sliding surface 34 of the cylinder housing 18, of the sealing element 30 is reliably prevented from being excessive, and thus, leakage of hydraulic fluid from the pressure chamber 20 is also prevented.

As can also be inferred from FIG. 1, the retaining ring 28 is secured to the extension 26 of the piston 14 by a snap connection 148. For that purpose, the retaining ring 28 according to FIGS. 12 to 15 has a plurality in the illustrated embodiment, for example, a total of four of spring arms 150 which extend in axial direction and which are provided at each of the free ends thereof and radially inwardly with a respective lug-like projection 152 in engagement with a radial groove 154, as illustrated in FIG. 11, formed at the outer circumference, i.e., outer circumferential surface 144 of the extension 26. As can be best seen in FIG. 12, the spring arms 150 of the retaining ring 28 as seen in circumferential direction are respectively arranged between adjacent stiffening elements 140 of the retaining ring 28 so that the stiffening elements 140 and the spring arms 150 of the retaining ring 28 are disposed approximately at the same axial location of the piston subassembly 12.

The retaining ring 28 is additionally provided at the side thereof facing the piston 14 with an annular pressing projection 156 which engages in an annular axial groove 158 of the sealing element 30. The axial groove 158 separates, on the side of the sealing element 30 opposite from the piston 14, the sealing lip 32 from an annular fastening section 160 of the sealing element 30. The fastening section 160 is seated on the extension 26 of the piston 14 in an annular axial groove 162 of the piston 14 open towards the pressure chamber 20.

Finally, the retaining ring 28 additionally has at the side thereof facing the piston 14 and radially within the pressing projection 156 a circularly annular planar end surface 164 by way of which the retaining ring 28 can be supported in an axial direction of the piston 14 on an associated annular shoulder 166, which according to FIG. 11 is formed at the outer circumference of the extension 26 of the piston 14 so that a mounting abutment is present which reliably prevents damage of the sealing element 30 and/or of the spring arms 150 with lug-like projections 152 of the retaining ring 28 at the time of assembly of these components which may be automated.

In this fashion, a hydraulic cylinder has a cylinder housing in which is formed a pressure chamber variably bounded on one side by a piston of a piston subassembly with a piston rod rigidly connected with the piston which is received in the cylinder housing to be longitudinally displaceable. The piston has an outer contour, which permits tilting, i.e. pivoting of the piston subassembly in the cylinder housing, and a projection, which is at the pressure chamber side and on which a sealing element is centered and retained by a retaining ring. The sealing element has an encircling sealing lip that slidably and sealably bears against a sliding surface of the cylinder housing. The retaining ring is provided on the side thereof opposite from the sealing element with a stiffened prolongation adapted in length and/or diameter to come into contact with the sliding surface so as to support the piston subassembly at the cylinder housing upon tilting of the piston subassembly in the cylinder housing by a predetermined tilt angle of the piston subassembly relative to a center axis of the cylinder housing.

Variations and modifications are possible without departing from the scope and spirit of the present invention as defined by the appended claims.

I claim:

1. A hydraulic cylinder for a hydraulic actuating system for motor vehicles, comprising a cylinder housing in which is formed a pressure chamber variably bounded on one side by a piston, which is received in the cylinder housing to be longitudinally displaceable, of a piston subassembly that includes the piston, a piston rod rigidly connected with the piston, an extension of the piston at a pressure chamber side, a sealing element, and a retaining ring that retains and centers the sealing element on the extension of the piston; wherein the piston has an outer contour permitting tilting of the piston subassembly in the cylinder housing, the sealing element having an encircling sealing lip slidably and sealably bearing against a sliding surface, which is at an inner circumference of the cylinder housing, characterized in that the retaining ring is provided with a prolongation on a side of the retaining ring opposite from the sealing element, said prolongation being adapted with respect to a length and/or diameter of the prolongation to come into contact with the sliding surface of the cylinder housing so as to support the piston subassembly at the cylinder housing upon tilting of the piston subassembly in the cylinder housing, by a predetermined tilt angle of the piston subassembly relative to a center axis of the cylinder housing, wherein the prolongation of the retaining ring has a substantially hollow-cylindrical outer section supported in radial direction on the extension of the piston by way of a plurality of stiffening elements uniformly distributed over an inner circumference of the outer section for stiffening the outer section, the stiffening elements radially extending from said inner circumference of the outer section to the extension of the piston.

2. A hydraulic cylinder according to claim 1, characterized in that each stiffening element extending along the outer section is constructed in the form of a hollow-chambered section member and has a substantially trapezium-shaped cross-section, wherein each stiffening element bears with a narrow side thereof against the extension of the piston.

3. A hydraulic cylinder according to claim 2, characterized in that the retaining ring is secured to the extension of the piston by a snap connection.

4. A hydraulic cylinder according to claim 1, characterized in that the retaining ring is provided at a side thereof facing the piston with an annular pressing projection engaged in an annular axial groove of the sealing element, said annular axial groove at the side of the sealing element opposite from the piston separating the sealing lip from an annular fastening section of the sealing element, the fastening section being seated on the extension of the piston.

5. A hydraulic cylinder according to claim 1, characterized in that the retaining ring has on a side thereof facing the piston a circularly annular planar end surface by way of which the retaining ring is supported in axial direction of the piston on an associated annular shoulder formed at an outer circumference of the extension.

6. A hydraulic cylinder according to claim 1, characterized in that a spring element is arranged at a side of the piston opposite from the pressure chamber, the spring element being supported at one end on a spring plate fastened to the cylinder housing and operatively connected at the other end with the piston rod so as to bias the piston subassembly in a direction away from a base of the cylinder housing.

7. A hydraulic cylinder according to claim 6, characterized in that a fixing section is provided, which fixes the piston subassembly in a predetermined stroke setting with respect to the cylinder housing prior to first actuation of the hydraulic cylinder and which is constructed to release the piston subassembly relative to the cylinder housing when first actuation of the hydraulic cylinder takes place, wherein the fixing section is provided at the spring plate and cooperates with a mating section at the piston rod for releasable fixing of the piston subassembly with respect to the cylinder housing.

8. A hydraulic cylinder according to claim 7, characterized in that the spring plate is formed by an annular member with an inner annular section through which the piston rod extends, an outer annular section by way of which the spring plate is secured to the cylinder housing, a base section connecting the inner annular section and the outer annular section, and an annular recess bounded between the inner annular section, the outer annular section and the base section, for receiving a piston-adjacent end of the spring element.

9. A hydraulic cylinder according to claim 8, characterized in that the inner annular section has at a free end thereof at the inner circumference an annular bead which forms the fixing section that is provided at the spring plate and is capable of radial spring-back, whereas the piston rod has a piston rod head provided at an outer circumference with a substantially crowned annular collar as seen in cross-section, which forms the mating section at the piston rod and which in the fixed state of the piston subassembly is axially supported on the annular bead.

10. A hydraulic cylinder according to claim 9, characterized in that the inner annular section of the spring plate, which is secured to the cylinder housing and has a defined rotational position about the center axis, is provided with cut-outs at sides which are diametrically opposite with respect to the center axis of the cylinder housing, said cut-outs in the released state of the piston subassembly permitting defined deflection of the piston rod relative to the center axis of the cylinder housing.

11. A hydraulic cylinder according to claim 10, characterized in that the spring plate has at a side of the base section opposite from the annular recess an annular centering projection having a conically chamfered inner circumferential surface with which a mating surface of complementary form at an outer circumference of the piston can be brought into contact, when the piston subassembly is released, so as to substantially align the piston rod with the center axis of the cylinder housing.

12. A hydraulic cylinder according to claim 11, characterized in that the piston is injection-molded from plastic material on the piston rod so as to rigidly connect the piston with the piston rod.

13. A hydraulic cylinder according to claim 8, characterized in that the inner annular section of the spring plate, which is secured to the cylinder housing and has a defined rotational position about the center axis, is provided with cut-outs at sides which are diametrically opposite with respect to the center axis of the cylinder housing, said cut-outs in the released state of the piston subassembly permitting defined deflection of the piston rod relative to the center axis of the cylinder housing.

14. A hydraulic cylinder according to claim 8, characterized in that the spring plate has at a side of the base section opposite from the annular recess an annular centering projection having a conically chamfered inner circumferential surface with which a mating surface of complementary form at an outer circumference of the piston can be brought into contact, when the piston subassembly is released, so as to substantially align the piston rod with the center axis of the cylinder housing.

15. A hydraulic cylinder according to claim 14, characterized in that the piston is injection-molded from plastic material on the piston rod so as to rigidly connect the piston with the piston rod.

16. A hydraulic cylinder according to claim 1, characterized in that the piston is injection-molded from plastic material on the piston rod so as to rigidly connect the piston with the piston rod.

17. A hydraulic cylinder for a hydraulic actuating system for motor vehicles, comprising a cylinder housing in which is formed a pressure chamber variably bounded on one side by a piston, which is received in the cylinder housing to be longitudinally displaceable, of a piston subassembly that includes the piston, a piston rod rigidly connected with the piston, an extension of the piston at a pressure chamber side, a sealing element, and a retaining ring that retains and centers the sealing element on the extension of the piston, wherein the piston has an outer contour permitting tilting of the piston subassembly in the cylinder housing, the sealing element having an encircling sealing lip slidably and sealably bearing against a sliding surface, which is at an inner circumference of the cylinder housing, characterized in that the retaining ring is provided with a stiffened prolongation on a side of the retaining ring opposite from the sealing element, said prolongation being adapted with respect to a length and/or diameter of the prolongation to come into contact with the sliding surface of the cylinder housing so as to support the piston subassembly at the cylinder housing upon tilting of the piston subassembly in the cylinder housing, by a predetermined tilt angle of the piston subassembly relative to a center axis of the cylinder housing; wherein the prolongation of the retaining ring has a substantially hollow-cylindrical outer section supported in radial direction on the extension of the piston by way of a plurality of stiffening elements uniformly distributed over an inner circumference of the outer section, wherein each stiffening element extending along the outer section is constructed in the form of a hollow-chambered section member and has a substantially trapezium-shaped cross-section, wherein each stiffening element bears with a narrow side thereof against the extension of the piston, wherein the retaining ring is secured to the extension of the piston by a snap connection, and wherein the retaining ring has a plurality of spring arms extending in axial direction and having a free end and each provided at the free end thereof radially inwardly with a lug-like projection in engagement with a radial groove formed at an outer circumference of the extension.

18. A hydraulic cylinder according to claim 17, characterized in that the spring arms of the retaining ring as seen in circumferential direction are respectively arranged between adjacent stiffening elements of the retaining ring.

* * * * *